United States Patent [19]

Arakane

[11] 4,023,089
[45] May 10, 1977

[54] GENERATOR VOLTAGE CONTROL APPARATUS

[75] Inventor: Kenjiro Arakane, Himeji, Japan

[73] Assignee: Mitsubishi Denki Kabushiki Kaisha, Tokyo, Japan

[22] Filed: Sept. 30, 1975

[21] Appl. No.: 619,940

[52] U.S. Cl. .............................. 322/28; 322/99; 320/48

[51] Int. Cl.$^2$ ................................ H02J 7/14

[58] Field of Search .......... 322/22, 28, 99; 320/48, 320/64, 68; 317/33 VR, 13 R; 340/248, 249

[56] References Cited

UNITED STATES PATENTS

| | | | |
|---|---|---|---|
| 3,469,167 | 9/1969 | Wright | 322/28 X |
| 3,492,559 | 1/1970 | Harris | 322/99 X |
| 3,496,443 | 2/1970 | Snedeker et al. | 322/99 X |
| 3,588,663 | 6/1971 | Hirata | 322/28 X |
| 3,938,005 | 2/1976 | Cummins | 322/28 X |
| 3,942,096 | 3/1976 | Itoh et al. | 317/33 VR X |

Primary Examiner—Robert J. Hickey
Attorney, Agent, or Firm—Oblon, Fisher, Spivak, McClelland & Maier

[57] ABSTRACT

A generator voltage control apparatus includes a generator with a field coil and a battery which is charged by the output of the generator. A first transistor is provided for controlling the current passed through the field coil to maintain constant the voltage of the generator. A charge display lamp is connected in series to the first transistor. A second transistor is connected in parallel to the charge display lamp connected in series so that the second transistor is turned on by a voltage generated by the generator and is turned off by an overvoltage generated thereby.

5 Claims, 2 Drawing Figures

GENERATOR VOLTAGE CONTROL APPARATUS

BACKGROUND OF THE INVENTION

1. Field of the Invention:

Apparatus for controlling the output voltage of a generator by using semiconductors have been used. Recently, a need for safety in these apparatus has increased and it has become an important problem to utilize a safety circuit in compact form. The present invention fills this need.

2. Description of the Prior Art:

Referring to FIG. 1, the conventional apparatus will be described.

In FIG. 1, the reference 1 designates an AC generator including an armature coil 2 and a field coil 3. The armature coil 2 is connected through a rectifier 4 to a battery 5.

One end of the field coil 3 is connected through a switch 6 to the battery 5. The other end of the field coil 3 is connected to a collector of a NPN type power transistor 9 which functions as a voltage adjustment device 8 in a voltage control apparatus 7 and is connected through the emitter to ground.

The base of NPN type power transistor 9 is connected through a resistor 10 and the key switch 6 to the battery 5. The collector-emitter of an NPN type transistor 11 is connected in parallel to the base-emitter of the power transistor 9.

The base of the NPN type transistor 11 is connected through a Zener diode 14 to the middle point of the series connection of a resistor 12 and a resistor 13 for detecting the output voltage after recification of the AC generator 1. The reference 15 designates a diode connected in parallel to the field coil 3. When the NPN type power transistor 9 is in the off state, the diode 15 absorbs the voltage induced in the field coil 3.

One end of a charge display lamp 16 is connected through the key switch 6 to the battery 5 and the other end is connected to the collector of a NPN type transistor 18 which functions as a discharge display circuit 17 of the voltage control apparatus 7 and is connected through its emitter to ground. The base of the NPN type transistor 18 is connected through a resistor 19 and the key switch 6 to the battery 5 and is also connected to the collector and emitter of an NPN type transistor 20 disposed in parallel to the base and emitter of the transistor 18.

The base of the NPN type transistor 20 is connected through a resistor 21 and a diode 22 to the neutral point of the AC generator 1. A capacitor 23 is connected to smooth the waveform between the contact of the resistor 21 and the diode 22 and ground.

In this voltage control apparatus, when the key switch 6 is turned on at the initiation of the driving, the base current of the NPN type power transistor 9 of the voltage adjustment device 8 is passed from the battery 5 through the key switch 6 and the resistor 10. At the same time, the exciting current is passed from the key switch 6 through the field coil 3 and the collector and emitter of the NPN type power transistor 9.

On the other hand, in charge display circuit 17, the base current of the NPN type transistor 18 is passed through the battery 5, the key switch 6 and the resistor 19. The current is passed from the key switch 6 through the charge display lamp 16 and the collector and emitter of the NPN transistor 18 so that the charge display lamp 16 is ignited to indicate the non-generation by AC generator 1.

When the speed of rotation of the AC generator 1 increases to generate a voltage to the armature coil 2 and to initiate the charge through the rectifier 4 to the battery 5, the base current of the NPN type transistor 20 is passed from the neutral point of the AC generator 1 through the diode 22 and the resistor 21 whereby the collector-emitter of the NPN type transistor 20 is turned on to form a short circuit between the base and emitter of the NPN type transistor 18. The base current of the NPN type transistor 18 is not passed to extinguish the charge display lamp 16 to indicate the generation by AC generator 1.

When the output voltage of the AC generator 1 becomes higher than a predetermined value, as is known, the current is passed through the Zener diode 14 and the base and emitter of the NPN type transistor 11 by the voltage shunt of the resistor 12 and the resistor 13 to detect the voltage at voltage adjustment device 8 and a short-circuit is formed between the base and emitter of NPN type power transistor 9. The current of the field coil is interrupted in the off state of NPN type power transistor 9. Accordingly, the output voltage of the generator 1 is decreased causing the off state of the NPN type transistor 11 and the on state of the NPN type power transistor 9.

This operation is repeated to maintain the output voltage constant. In this apparatus, when the voltage control function is lost because of the short-circuit of the collector and emitter of the NPN type power transistor 9 of the voltage adjustment device 8, or the open-circuit of the NPN type transistor 11 or the Zener diode 14, or a disconnection of the resistor 12, the battery 5 is charged by the AC generator 1 under abnormal overvoltage. Over current is passed to cause a rise in temperature of the battery 5 and the wiring, and as a result thereof a dangerous accident may occur. Also, there is a disadvantage of interruption of an electric load (not shown) connected in paralled to the battery 5 caused by the overvoltage.

SUMMARY OF THE INVENTION

It is an object of the present invention to provide a voltage control apparatus for a generator which interrupts the current passed through a field coil and generates an alarm using a charge display lamp when voltage control function is lost.

The foregoing and other objects are attained in accordance with one aspect of the present invention through the provision of a generator voltage control apparatus comprising a generator having a field coil, a battery charged by the output of the generator, a first transistor for controlling current passed through the field coil to maintain constant the voltage of the generator, a charge display lamp connected in series to the first transistor, and a second transistor connected in parallel to the charge display lamp. so that the seond transistor is turned on by a voltage generated by the generator and is turned off by an overvoltage generated thereby.

BRIEF DESCRIPTION OF THE DRAWINGS

Various objects, features and attendant advantages of the present invention will be more fully appreciated. as the same becomes better understood from the following detailed description of the present invention when considered in connection with the accompanying drawings, in which.

DETAILED DESCRIPTION OF A PREFERRED EMBODIMENT

Figure 1:
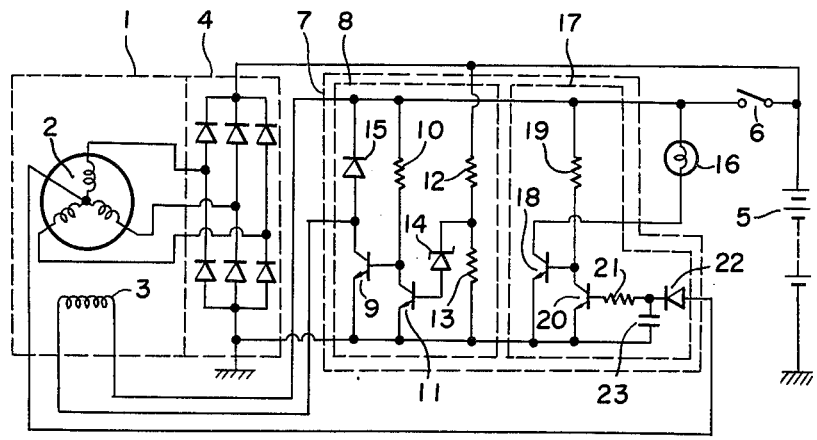
FIG. 1 is a diagram of a circuit of conventional apparatus.

Reference now will be made to the drawings wherein like reference numerals designate identical or corresponding parts throughout the several views.

Figure 2:
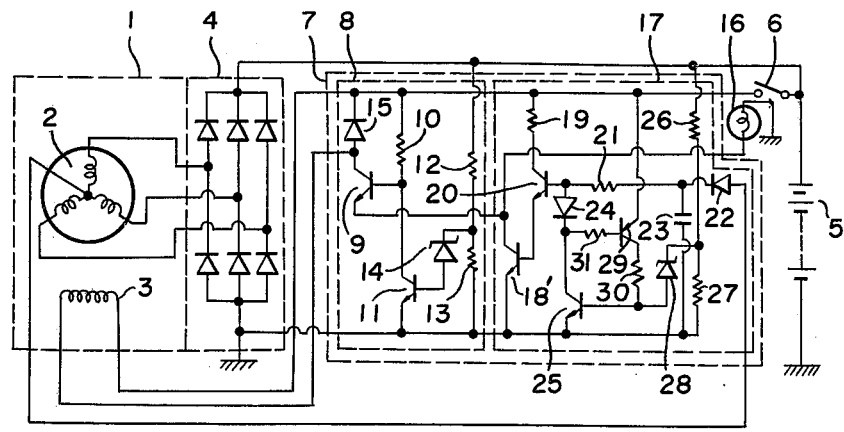
FIG. 2 is a diagram of a circuit of one embodiment according to the invention.

In FIG. 2, in the voltage adjustment device 8 of the voltage control apparatus 7, the emitter of the NPN type power transistor 9 is connected to the collector of the NPN type transistor 18' in the charge display circuit 17 and the emitter of the NPN type transistor 18' is grounded. In the charge display circuit 17, one end of the charge display lamp 16 is connected to the collector of the NPN type transistor 18' and the other end of the lamp is grounded. The connection of the charge display lamp 16 is therefore different than as shown in FIG. 1.

The base of the NPN type transistor 18' is connected through the emitter and collector of the NPN type transistor 20 to the resistor 19. The contact of the base of the NPN type transistor 20 with the resistor 21 is connected through the diode 24 and the collector and emitter of the NPN type transistor 25 to ground. The base of the NPN type transistor 25 connected through a Zener diode 28 to a middle point in a series connection of resistor 26 and resistor 27 which are used for detecting the output voltage after rectification of the AC generator 1.

The base of NPN type transistor 25 is connected to the key switch 6 through the emitter and collector of the PNP type transistor 29 and the resistor 30. The base of the PNP transistor 29 is connected through the resistor 31 to the contact between the collector of the NPN transistor 25 and the diode 24.

In this voltage control apparatus, the key switch 6 is turned on to initiate operation. The base current of NPN type power transistor 9 is passed from the battery 5 through the key switch 6, the resistor 10, the base and eitter of the NPN type power transistor 9 to the charge display lamp 16. At the same time, the weak field current is passed from the key switch 6 through the field coil 3, the collector and emitter of the NPN type power transistor 9 to the charge display lamp 16.

The resistance of the field coil 3 is about 1/10–1/20 of the resistance of the charge display lamp 16 in the on state. Accordingly, the weak field current is enough to ignite the charge display lamp 16 and to impart a rising voltage to the generator for charging. The voltage at the neutral point is increased depending upon the increase in speed of rotation of the AC generator whereby the base current of the NPN transistor 20 passed through the diode 22 and the resistor 21 in the charge display circuit 17 is passed through the base and emitter of the NPN type transistor 18' to turn on the NPN type transistor 20.

The base current of NPN type transistor 18' is passed from the key switch 6 through the resistor 19 and the collector and emitter of the NPN type transistor 20 whereby the NPN type transistor 18' is also turned on.

Accordingly, the emitter of the NPN type power transistor 9 in the voltage adjustment device 8 is grounded through the NPN type transistor 18' and a short circuit is formed for the charge display lamp 16 to extinguish the lamp.

When the output voltage of the AC generator 1 is above a predetermined value, the voltage adjustment device 8 operates as stated in the base of FIG. 1. When the voltage adjustment device 8 is in a non-controlling condition because of an inner short circuit of the collector and emitter of the NPN type power transistor 9 or an inner open circuit of the collector and emitter of the NPN type transistor, the output voltage of the AC generator 1 increases beyond the predetermined value. The Zener diode 28 is turned on by the voltage shunt of the resistor 26 and the resistor 27 which are connected in the charge display circuit part 17 whereby base current is fed to the NPN type transistor 25 to turn on the NPN type transistor 25.

The base potential of the NPN type transistor 20 is decreased to turn off the transistor 20. Accordingly, the base current of the NPN type transistor 18' is interrupted to turn off the transistor 18'.

The current passed to the field coil 3 is only the current passed through the charge display lamp 16 so that the ability to charge the battery 5 is lost which ignites the charge display lamp 16 for indicating the fault. The output voltage is decreased by decreasing the current fed to the field coil whereby the Zener diode 28 is turned off.

In order to prevent the return to the exciting condition of the off state of the NPN type transistor 25, the on state of the NPN type transistor 20 and the on state of the NPN type transistor 18', the base current of the PNP transistor 29 is passed from the key switch 6, through the emitter and the base resistor 31, through the collector of the NPN transistor 25 to the emitter thereof whereby a self sustaining circuit is formed to pass the base current from the emitter through the collector resistance 30 to the NPN type transistor 25.

In this embodiment, only charge display lamp 16 is connected in parallel to the collector and emitter of the NPN type transistor 18'. However, it is possible to connect a resistor in parallel to the charge display lamp 16 to adjust the voltage rise characteristics of the generator 1. The voltage at the neutral point of the generator 1 is applied for driving the NPN type transistor 20 in the charge display circuit. However, this can be a single phase voltage or another rectification output.

As stated above, in accordance with the invention, several elements are connected to the charge display circuit whereby the output voltage of the generator is controlled, various loads are protected from overvoltage and an alarm is generated by the charge display lamp when the voltage adjustment function is lost.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A generator voltage control apparatus comprising: a generator for generating an output voltage, the generator having a field coil and an output coil;
a battery charged by the output of the generator, one terminal of the battery being connected to the output coil and also adapted for connection to one end of the field coil;

a first transistor having an on state and an off state and connected to the other end of the field coil for controlling current passed through the field coil to maintain constant the voltage of the generator;

a charge display lamp connected in series between the first transistor and the other terminal of the battery; and a second transistor having an on state and an off state and connected in parallel to the charge display lamp, the second transistor when in its on state forming a short circuit for the charge display lamp.

2. The generator voltage control apparatus according to claim 1 including constant voltage means actuatable by the generating of an output voltage in excess of a predetermined voltage by the generator for putting the first transistor in its off state to control the current path through the field coil.

3. The generator voltage control apparatus according to claim 1 including constant voltage means actuatable by the generating of an output voltage in excess of a predetermined voltage by the generator for putting the second transistor in its off state.

4. The generator voltage control apparatus according to claim 3 including self-sustaining circuit means for maintaining the off state of the second transistor after the constant voltage means is actuated.

5. A generator voltage control apparatus comprising:

a generator for generating an output voltage, the generator having a field coil and an output coil;

A battery which is charged by the output voltage of the generator, one terminal of the battery being connected to the output coil and also adapted for connection to one end of the field coil;

A first transistor having an on state and an off state and connected in series to the other end of the field coil;

first constant voltage means actuatable by the generating of an output voltage in excess of a predetermined voltage by the generator for putting the first transistor in its off state;

a second transistor having an on state and an off state and connected between the first transistor and the other terminal of the battery;

a charge display lamp connected in parallel to the second transistor;

a third controllable transistor connected to the second transistor for putting the second transistor in its off state; and second constant voltage means actuatable by the generating of an output voltage in excess of the predetermined voltage by the generator for controlling the third transistor to put the second transistor in its off state.

* * * * *